B. D. WASHBURN.

Shutter-Fastenings.

No. 5,625. Reissued Oct. 21, 1873.

WITNESSES:

Fred. A. Chapman

Julius S. Pallon

INVENTOR:

Benjamin D. Washburn

AM. PHOTO-LITHOGRAPHIC Co. N.Y. (OSBORNE'S PROCESS)

UNITED STATES PATENT OFFICE.

BENJAMIN D. WASHBURN, OF BOSTON, MASSACHUSETTS.

IMPROVEMENT IN SHUTTER-FASTENINGS.

Specification forming part of Letters Patent No. 94,363, dated August 31, 1869; reissue No. 5,625, dated October 21, 1873; application filed July 26, 1873.

*To all whom it may concern:*

Be it known that I, BENJAMIN D. WASHBURN, of the city of Boston, in the county of Suffolk and Commonwealth of Massachusetts, have invented certain new and useful Improvements in Window Blind or Shutter Fastenings; and I do hereby declare the following to be a full, clear, and exact description of the same, reference being had to the accompanying drawings, which form a part of this specification, and in which—

Figure 1:
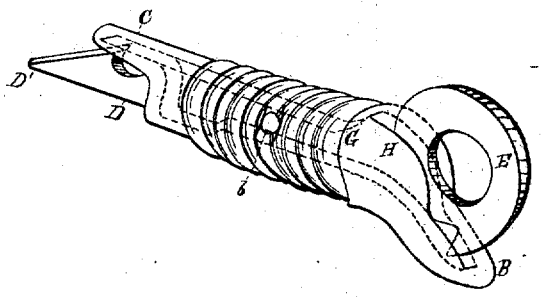
Figure 2:
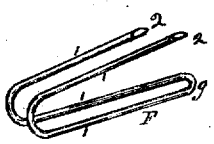
Figure 3:
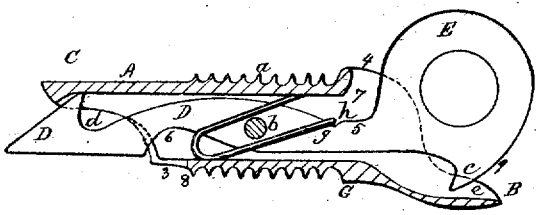

Figure 1 represents a perspective view of my improved fastening. Fig. 2 represents the operating-spring, as will be hereafter described; and Fig. 3 represents a longitudinal central section.

To enable those skilled in the art to which my invention belongs to make and use the same, I will proceed to describe it in detail.

The nature of my invention consists, first, in the combination, with the catch-piece, of a screw-threaded shell or case, provided with slots formed in the sides, and lengthwise of said shell at the respective ends thereof, substantially as and for the purposes hereinafter stated; second, in the combination, with the case which supports the catch or hook piece or device, of recessed projecting lips, as hereafter set forth; third, in the combination of certain devices, as hereafter explained, to form an improved window blind or shutter fastening.

In the drawings, the part marked or lettered A is the metallic case, which, in this instance, is made in one piece; but it may be made in two, if preferred. This case A has a screw-thread, *a*, formed upon a part of its outer surface, as indicated in the drawings, whereby it can be screwed into a hole bored of the proper size in the blind, and which hole it is the general practice to bore in the blind-base. The hole should be of such a size that the thread *a* will have a firm and secure hold upon the fibers of the wood. In making the case it is well to make it a little tapering, and also to make the thread *a* some larger in diameter as it extends back toward the head of the case, thereby insuring a more easy entrance of the threaded shell into the hole in the blind, while at the same time rendering the threaded shell secure in position when once screwed into the desired position. From the head of the shell A projects a lip or recessed tip, B, while from the other end of the shell projects a recessed lip or tip, C. Within the shell A is hinged or pivoted at *b* a catch-piece, D, one end of which is provided with an enlarged part, E, from one edge of which projects a hook, *c*, while the other end of said catch-piece D is made bending on one edge, and has a hook, *d*. The points of the hooks *c* and *d* rest in their respective recesses *e* and *f* when the catch-piece D is in the position shown in the drawings. A spring, F, is combined with the shell and catch-piece, as indicated in the drawings, the loop *g* of the spring resting in a recess or groove, *h*, in one edge of the catch-piece, while the ends 2 2 of the spring bear against the inside of the shell, with the sides 1 1 on each side of the catch-piece D, as indicated in Fig. 3, and thus, by means of its spring-action upon the catch-piece D, keeps the hooks *c* and *d* in the positions shown, except when they are pressed out in closing or opening the blind, in which case the spring is contracted as the catch-piece D turns on its pivot *b*. The recesses *e* and *f* serve a very good purpose in keeping the ends of the catch-piece D from being twisted out of line while the device is being inserted into the blind. The ends of the shell or case A are slotted out, as seen at 3 and 4, the slots being formed in the sides of and lengthwise of the shell or case, as shown, in such position and of such width as to permit a free play of the catch-piece D upon its pivot *b*. With a view to obtain the desired strength in the catch-piece, while at the same time using a small shell or case, a depression is made at 5, and quite a curve at 6, in the edge of said hook or catch-piece.

By means of this construction, it will be seen that the necessary and desired movements of the hooks *c* and *d* can be obtained before the depressed part 5 will strike against the end 7 of slot 4, or the curved part 6 will strike against the end 8 of the slot 3.

By making the head of the shell with an enlarged or ring-like part, G, back of the screw-thread, and then extended back, as shown at H, two objects are obtained. The ring or enlarged part G can be made to serve as a stop or shoulder, to abut against the side of the blind when the shell is screwed in, while the extended part H serves to support the end E of the catch-piece D and the lip B. It can also be used as a handle, to draw the blind to or push it back with.

My invention can be applied to a shell or case made in two parts, as before suggested; and when so made the slots 3 and 4 may be made partly in each half.

A staple or other suitable device is driven into or otherwise attached to the wall or side of the building, and a similar suitable device is secured to the window-sill, said staples or suitable attaching devices being so arranged that when the blind is thrown back the beveled end D′ will be depressed and pass under the wall staple or catch, thereby permitting the hook *d* to catch and hold the blind back, and so that when the blind is closed the curved part *g* will strike against the window-sill catch device, thus raising the hook *c*, which passes over and catches upon the window-sill device, thereby holding the blind in a closed position until the hook *c* is raised again.

It will be seen that by raising the end E the blind can be unhooked or fastened, whether it be in a closed or open position.

In applying the device I prefer to have the shell or case screwed into the blind, with the head upon the inside, and the catch-piece D with hook *c* down and hook *d* up; but the device will operate when arranged differently, and consequently the position or arrangement may be such as to suit the condition of the circumstances under which the device is to be used.

Having described my improvements in window blind or shutter fastenings, what I claim therein as new, and desire to secure by Letters Patent, is—

1. The combination, with the catch-piece, of the screw-threaded shell or case, provided with slots 3 and 4 formed in the sides and lengthwise of the shell, at the respective ends thereof, substantially as and for the purposes described.

2. The screw-threaded shell or case, having recessed projecting lips B C, in combination with the catch-piece, substantially as and for the purposes set forth.

3. The combination, with the shell or case A, provided with the external screw-thread *a* and lips B and C, of the catch part D and operating-spring, substantially as and for the purposes set forth.

BENJAMIN D. WASHBURN.

Witnesses:

H. W. CHAFLIN,

C. W. SUMNER.